Sept. 7, 1937.   R. S. WHITTINGTON   2,092,235
VACUUM CRANKCASE AND CHASSIS VENTILATOR
Filed March 20, 1933

Inventor:
Ralph S. Whittington

Patented Sept. 7, 1937

2,092,235

UNITED STATES PATENT OFFICE 2,092,235

VACUUM CRANKCASE AND CHASSIS VENTILATOR

Ralph S. Whittington, Oak Park, Ill., assignor to Bendix Products Corporation, South Bend, Ind., a corporation of Indiana Application March 20, 1933, Serial No. 661,800

12 Claims. (Cl. 184—6)

This invention relates to applying vacuum to the interior of the crankcase, transmission, axle housing, wheel bearings, steering gear housing, or any lubricated gear box on the chassis of an automotive vehicle. One of the primary objects of this invention is to provide a complete ventilating system for the crankcase of the motor of the vehicle with which the system is associated. A further object of this invention is to reduce oil leaks in the various above mentioned units, or any other unit which normally maintains a quantity of oil for its lubrication.

In the past considerable difficulty has been had with preventing oil from leaking from the various units of the chassis of an automobile. This has been particularly true of the crankcase, transmission, rear axle and rear wheel bearings. Many schemes have been employed of packing the rear wheel bearings to prevent the loss of oil, and none of these have entirely prevented trouble. This invention contemplates the use of intake manifold vacuum to reduce the pressure within these various chassis units for the purpose of preventing these leaks which normally exist and at the same time make possible more positive ventilation of the crankcase of the vehicle.

This invention also contemplates the use of a one way check valve between the intake manifold and the various units connected to the intake manifold whereby the flow of gas is allowed to take place only in the direction of the manifold. Also this invention contemplates the use of baffles and filters to prevent a flow of oil, which may be suspended in vapor form, to the intake system. Also this invention provides a pressure regulating check valve to be used on any of the various units affected to limit the degree of vacuum which may exist within the unit.

Figure 1:
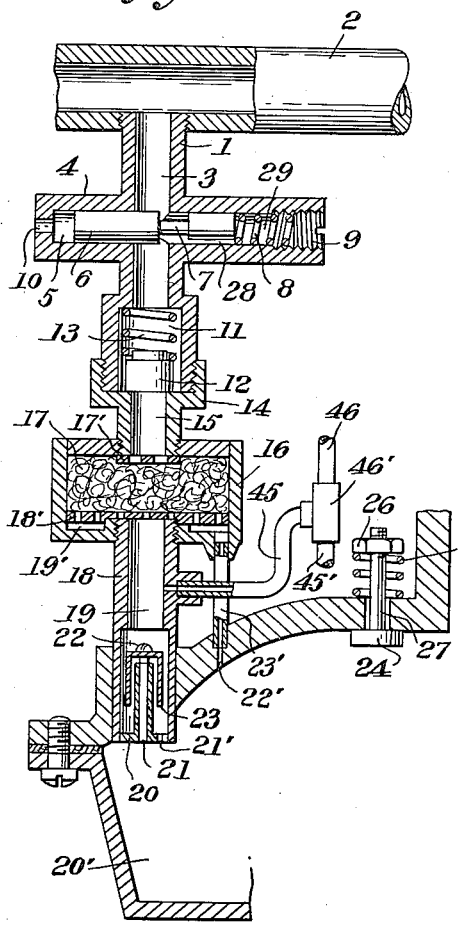
Figure 1 is a semi-diagrammatic view partly in section of the crankcase ventilating system.

Referring then to the drawing, there is shown in Figure 1 a system comprised of the conduit 1 which is tapped into any section of the intake system 2. The conduit 1 has the passage 3 which communicates with the interior of the intake manifold. Conduit 1 is provided with a lateral extension 4, which contains the bore 5, which slidably receives the piston 6. Piston 6 is provided with reduced portion 7 and is actuated by spring 8. Plug 9 is provided to adjust the tension of spring 8, and port 10 is provided to expose piston 6 to atmospheric pressure. Conduit 1 is further provided with the bore 11 which contains the check valve 12 which is actuated by spring 13. Tapped onto the conduit 1 is the adapter 14 which forms a seat for the check valve 12, and provides a passage 15 to the interior of the filter casing 16. The interior of the filter casing 16 is provided with the fibrous material 17, or any material offering a passage to gas. The perforated retaining cap 17' is located between the passage 15 and the material 17. Into the opposite side of the filter casing 16, is tapped the conduit 18 which provides the passage 19 to the interior 20' of the crankcase. Into the end of passage 19 the member 20 is fitted and provides the passage 21 communicating with the passage 19. The machine screw 22 holds the baffle 23 over the end of passage 21. The perforated retaining plate 18' is provided at the inlet of filter casing 16 to separate material 17 from passage 19 and the space 19' thus provided in the casing 16. The conduit 23' is tapped into the filter casing 16 so as to communicate with the space 19' therein, and also with the interior 20' of the crankcase through the port 22'.

Check valve 24 is actuated by spring 25 which is held in place by retaining nut 26, and is provided to control the passage of air into port 27.

Figure 2:
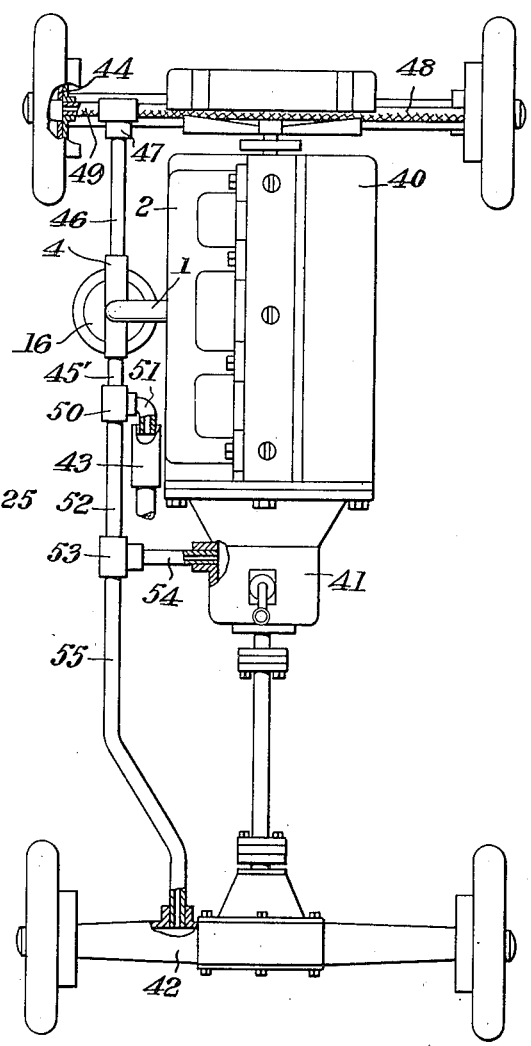
Figure 2 is a semi-diagrammatic view partly in section of some of the chassis units with which this system is associated.

Figure 2 is a plan view of some of the units of the chassis of an automotive vehicle with which this system is associated. The numeral 40 designates the motor generally. The numeral 2 designates the intake manifold. 41 designates the transmission of the vehicle, and 42 the rear axle housing. The steering gear housing is represented by the numeral 43. A front wheel bearing is designated by the numeral 44. Tapped into the conduit 18 of Figure 1, is the conduit 45 which communicates with the passage 19 of conduit 18. The conduit 45 is provided with the T fitting 46' and the extention 46 which leads to the T fitting 47, and the flexible conduits 48 and 49 lead from the T fitting 47 to the interior of the front wheel bearings as at 44. Conduit 45' is also provided with the T fitting 50 which communicates through conduit 51 with the interior of the steering gear housing 43. A further extension 52 of conduit 45' is tapped into the T fitting 53 which is provided with a conduit 54 communicating with the interior of the transmission 41. The conduit 55 is a further extension of this system which communicates with the interior of the axle housing 42.

Figure 3:
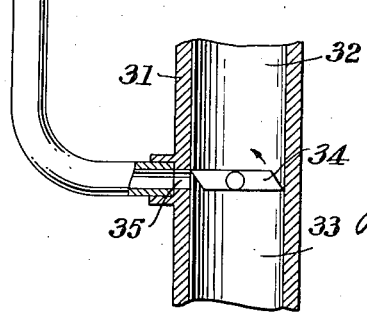
Figure 3 is a fragmentary sectional view illustrating an optional control means for this system.

Figure 3 illustrates an alternate method of connecting the apparatus illustrated in Figure 1, to the intake system. The carburetor riser 31 is divided into passage 32, adapted to be connected to the intake manifold, and the passage 33, adapted to be connected to the carburetor of the vehicle, by the throttle valve 34. Port 35 is located by choice to either entirely shut off vacuum from conduit 30 when the throttle valve 34 is closed or to restrict the opening between the conduit 30 and passage 32 to some pre-determined degree when the throttle valve is closed.

In the operation of the system vacuum exists, while the motor is operating, in the interior of the intake manifold 2 and this vacuum is transferred through the passage 3 and by virtue of reduced portion 7 of the piston 6 to passage 11. The pressure within crankcase 20' acting through passage 15, opens the check valve 12 and allows gas to move through passages 15, 11 and 3 into the intake system. However the vacuum from the intake system also acts through the groove 28 provided in piston 6, creating lower than atmospheric pressure in the spring chamber 29. This allows atmospheric pressure to act through port 10 on piston 6 and move piston 6 against the pressure of spring 8. This action tends to close the passage 3 but as soon as valve 6 approaches the point that it begins closing, it tends to shut off the source of energy, that is the vacuum in manifold 2, which tends to close valve 6. Thus valve 6 acts as a vacuum regulating valve which limits the degree of intake manifold vacuum which can exist in the passage 11. The adjustment 9 provided for the spring 8 makes possible the easy control of the vacuum in this system. This vacuum then acts through the filtering material 17, through passages 19 and 21 to the interior of the crankcase thereby removing fumes from the crankcase and reducing the pressure within the crankcase. This vacuum can never exceed the value at which air pressure acting through the port 27 will overcome the spring 25 and open the crankcase to the atmosphere. This is a safety precaution to insure that the sticking or freezing of valve 6 will not subject the crankcase to full manifold vacuum. The baffle 23 is provided to separate the oil which might be drawn through the passage 21 from the air. The rapid change in direction of flow caused by this baffle separates the fine particles of oil from the air and allows the oil to flow back into the crankcase through the hole 21'. The perforated plates 17' and 18' hold the material 17 in place and the plate 18' also provides the space 19' at the bottom of the casing 16 for oil to collect from the material 17. This oil is drained back to the crankcase through the conduit 23' and the port 22'.

The check valve 12 is placed in the passage 11 to insure that the combustible mixture drawn into the intake system of the engine will under no circumstances be admitted to the crankcase of the engine or other parts of the vehicle that may be connected to the system.

In Figure 3 a means of connecting the above system to the intake system is provided which will act to disconnect the system from the intake manifold vacuum when the throttle valve is closed or at any pre-determined setting of the throttle valve. Likewise this method of control makes possible the restriction of the connection between the intake manifold and the above system at any pre-determined position of the throttle valve. This method of connection is sometimes desirable since it reduces, or if so desired, entirely cuts out the flow of air or gas through this system to the intake manifold when the speed of the motor is reduced, thereby preventing any disturbance of the carburetion of the motor at low speeds. The conduit 30 is adapted to be connected by any convenient means to the passage 3 of Fig. 1, and communicates with the carburetor riser 31 thru the port 35. When the throttle valve 34 is closed, as in Fig. 3, the port 35 is exposed to atmospheric pressure existing in the passage 33 of the carburetor riser 31, since this side is adapted to be connected to the carburetor of the vehicle motor. As the throttle valve 34 is opened, the port 35 will be exposed to vacuum in the passage 32 of the riser 31, since this passage (32) is adapted to be connected to the intake manifold of the motor. Obviously port 35 can be moved upward with reference to the throttle valve 34 to secure results to be described later. The port 35 is so arranged that it is exposed to atmospheric pressure when the throttle valve is closed as it is shown in Figure 3. This also provides an opening to the atmosphere from the interior of the crankcase in case the pressure in the crankcase becomes higher than atmospheric pressure due to the transfer of pressure from the combustion chamber past the pistons of the motor. However, as the throttle valve 34 is opened the port 35 is exposed to the vacuum in the intake system. The result is that the port 35 also acts as a pressure regulating valve and its effect as such will vary, as the port 35 is moved upward toward the intake manifold or downward toward the carburetor. If it is desired to maintain some vacuum on the port 35 even while the motor idles, the port 35 can be raised slightly thereby insuring an opening of some degree between the intake system and the port 35 at all times.

The result of the structure shown in Fig. 2 is that the vacuum existing in passage 11 of Figure 1 and controlled by the vacuum regulating valve 6 is transferred through the conduit 45 to the interior of the various chassis units above described. The result of the reduction of pressure within the above units insures that atmospheric pressure acting on the exterior of these units will prevent oil from leaking out of any small openings or crevices which normally exist in such units. In the case of the crankcase a certain volume of gas should be removed to insure its proper ventilation and the amount of gas thus removed is to be controlled by the nature and size of air inlet passages provided in the manufacture of the motor.

It is obvious that by the adjustment of the degree of vacuum transferred to the system by the adjustment of the spring 8 with the plug 9 and by controlling the nature and size of the air inlet passages to the above units that the quantity of air taken into the intake system can be readily controlled and limited to a degree that the carburetion of the motor will not be affected. Also it is obvious that the carburetor of the motor can be calibrated with respect to this influx of air in cases where this is necessary.

While this invention has been described with some detail, it is understood that the description is for the purpose of illustration only and is not to be construed as definitive of the limits of the inventive idea. The right is reserved to make such changes in the detail of construction and arrangement of parts as will fall within the purview of the following claims.

What I claim is:

1. The combination with the intake manifold and a machine housing of a motor vehicle, of a means providing a passage between said intake manifold and said housing, and a valve in said passage, said valve being actuated by vacuum in said intake manifold and by resilient means, said resilient means acting to open said passage and vacuum acting to close said passage.

2. The combination with the intake manifold and a machine housing of a motor vehicle, means providing a passage between the intake manifold and said housing, and a baffle in said passage, said baffle acting to change the direction of the flow of gas through said passage whereby heavier particles are separated from said gas.

3. The combination with the intake manifold of an engine and a machine housing of a motor vehicle, means providing a passage between the intake manifold and said housing, and means whereby the flow capacity of said passage is reduced proportionately as the speed of said motor is reduced to a predetermined value as a result of the load on the engine.

4. The combination with the intake manifold and a machine housing of a motor vehicle, means providing a passage between the intake manifold and said housing, and a means whereby the area of said passage is reduced as the speed of said motor is reduced to a predetermined value.

5. The combination with the intake manifold, and a machine housing of an automotive vehicle, of means providing a passage between said intake manifold and the interior of said housing, and a valve in said passage, said valve being actuated by vacuum existing in said passage beyond said valve, said vacuum acting to close said valve, and resilient means associated with said valve and acting to open said valve.

6. The combination with the intake manifold, and a machine housing of an automotive vehicle, of means providing a passage between said intake manifold and the interior of said housing, a valve in said passage, said valve being actuated by vacuum existing in said passage beyond said valve, said vacuum acting to close said valve, resilient means associated with said valve and acting to open said valve, and a one way check valve in said passage beyond said valve, said check valve permitting the flow of gas in a direction toward said intake manifold only.

7. The combination with the intake manifold, and a machine housing of an automotive vehicle, means providing a passage between said intake manifold and the interior of said housing, a valve in said passage, said valve being actuated by the vacuum existing in said passage beyond said valve, said vacuum acting to close said valve, resilient means associated with said valve and acting to open said valve, and a filter in said passage, said filter being composed of loose or fibrous material capable of penetration by gas and exposing a relatively large surface to said gas as it passes through said filter.

8. The combination with the intake manifold, and a machine housing of an automotive vehicle, of a means providing a passage between said intake manifold and the interior of said housing, a valve in said passage, said valve being actuated by the vacuum existing in said passage beyond said valve, said vacuum acting to close said valve, resilient means associated with said valve and acting to open said valve, and a baffle in said passage, said baffle acting to change the direction of the flow of gas in said passage whereby heavy material is separated from the gas by means of its greater density.

9. In an automotive vehicle, an engine having an intake manifold, means including a housing to transmit power from the engine to drive the vehicle, connecting means between the manifold and the housing, valve means controlling the connecting means, and yielding means urging the valve means toward the open position against the force exerted in the manifold tending to close the valve means.

10. In a vehicle, an engine having an intake manifold including a source of suction, means including a housing to transmit power from the engine to drive the vehicle, a conduit interconnecting the housing and the manifold, valve means controlling the conduit, yielding means urging the valve means toward open position, and suction responsive means urging the valve means toward closed position.

11. In a vehicle, an engine having an intake manifold, means including a housing to transmit power from the engine to drive the vehicle, means to subject the housing to suction comprising a conduit interconnecting the housing and the manifold, and suction responsive valve means to vary the degree of suction to which the housing is subjected in accordance with the degree of suction exerted in the intake manifold.

12. In a vehicle, an engine including a source of suction, means including a housing to transmit power from the engine to drive the vehicle, fluid transmitting means interconnecting the housing and the source of suction, and pressure responsive valve means to vary the degree of suction to which the housing is subjected in accordance with the degree of suction exerted in the intake manifold.

RALPH S. WHITTINGTON.